(12) United States Patent
Gianoulakis et al.

(10) Patent No.: US 9,721,106 B2
(45) Date of Patent: Aug. 1, 2017

(54) METHOD AND SYSTEM FOR SCANNING A COMPUTER SYSTEM FOR SENSITIVE CONTENT

(71) Applicant: Accenture Global Services Limited, Dublin (IE)

(72) Inventors: George P. Gianoulakis, Chicago, IL (US); Eric J. LePenske, Chicago, IL (US); Kara Leonard, San Francisco, CA (US); Joseph E. Kaplan, Chicago, IL (US); Jim Wangji Yuan, Chicago, IL (US); Jeffry McIlrath, Geneva, IL (US)

(73) Assignee: Accenture Global Services Limited, Dublin (IE)

( * ) Notice: Subject to any disclaimer, the term of this patent is extended or adjusted under 35 U.S.C. 154(b) by 278 days.

(21) Appl. No.: 14/531,890

(22) Filed: Nov. 3, 2014

(65) Prior Publication Data

US 2015/0067843 A1    Mar. 5, 2015

Related U.S. Application Data

(63) Continuation of application No. 12/457,954, filed on Jun. 25, 2009, now Pat. No. 8,898,774.

(51) Int. Cl.
*G06F 21/57* (2013.01)
*G06F 21/50* (2013.01)
*G06F 21/62* (2013.01)

(52) U.S. Cl.
CPC ............ *G06F 21/577* (2013.01); *G06F 21/50* (2013.01); *G06F 21/6245* (2013.01); *G06F 2221/2143* (2013.01)

(58) Field of Classification Search
CPC .... G06F 21/50; G06F 21/577; G06F 21/6245; G06F 2221/2143
See application file for complete search history.

(56) References Cited

U.S. PATENT DOCUMENTS

| | | | | |
|---|---|---|---|---|
| 7,710,912 B1* | 5/2010 | Myles | ....................... | G06F 8/61 370/310 |
| 7,720,853 B1* | 5/2010 | Siegel | .................... | G06Q 10/10 707/754 |
| 2003/0163311 A1* | 8/2003 | Gong | ....................... | G10L 17/26 704/250 |
| 2004/0060045 A1* | 3/2004 | Hind | ................... | G06F 11/2247 717/174 |

(Continued)

*Primary Examiner* — John B King
*Assistant Examiner* — Arya Golriz
(74) *Attorney, Agent, or Firm* — Harrity & Harrity, LLP

(57) ABSTRACT

A computer-implemented method for scanning a computer system for sensitive data. A scan manager manages a scan of files of a second computer. The scan manager receives a request to scan and identify files stored on the second computer based on at least one category of sensitive data. The scan manager receives scan report recipient information and generates a user profile based on the at least one category and the recipient information. The scan manager makes the user profile available to a category server for use in creating a scan profile defining the scan criteria and deploys a scan agent to a computer to conduct the scan based on the scan profile. When the scan is complete and upon creation of the scan report, the scan manager makes the scan report available to the intended recipients.

23 Claims, 15 Drawing Sheets

(56) References Cited

U.S. PATENT DOCUMENTS

| | | | |
|---|---|---|---|
| 2005/0050318 A1* | 3/2005 | Alone | H04L 63/0428 713/155 |
| 2005/0063324 A1* | 3/2005 | O'Neill | H04L 12/2856 370/310 |
| 2005/0064850 A1* | 3/2005 | Irlam | G06Q 10/107 455/414.1 |
| 2006/0003306 A1* | 1/2006 | McGinley | G09B 3/00 434/350 |
| 2006/0236382 A1* | 10/2006 | Hinton | H04L 63/0815 726/8 |
| 2007/0143824 A1* | 6/2007 | Shahbazi | H04L 63/083 726/1 |
| 2008/0222300 A1* | 9/2008 | Bouazizi | H04H 20/28 709/231 |
| 2009/0282400 A1* | 11/2009 | Jung | H04L 12/2809 717/174 |
| 2010/0107257 A1* | 4/2010 | Ollmann | G06F 21/566 726/24 |
| 2010/0333199 A1* | 12/2010 | Gianoulakis | G06F 21/577 726/22 |
| 2012/0057180 A1* | 3/2012 | Lee | G06F 21/608 358/1.13 |
| 2015/0034720 A1* | 2/2015 | Minogue | G06Q 10/083 235/385 |

* cited by examiner

Content Scanning

User Name: Doe, John    Supervisor Name: Tim, John    Date: 01/07/2008

Sensitive Data Incident:

File Name                       File Location        Category
CreditCardInformation.doc       C:\Data\Client1      Payment Card Industry (PCI)

Summary:                Categories Scanned:    Payment Card Industry (PCI)
Total documents scanned: 00001                 Personal Identifiable Information (PII)
Total sensitive data files : 00001             Confidential Information (CI)
                                               Employee Financials
                                               Corporate Financials
                                               Price Information
                                               HIPAA Policy
                                               Sarbanes-Oxley
                                               Resumes

METHOD AND SYSTEM FOR SCANNING A COMPUTER SYSTEM FOR SENSITIVE CONTENT

RELATED APPLICATIONS

This is a continuation of application Ser. No. 12/457,954, filed Jun. 6, 2009, now allowed, which is incorporated herein by reference in its entirety.

TECHNICAL FIELD

The present disclosure relates to a service for scanning computer systems in order to detect sensitive data.

BACKGROUND

Increasingly, the control of sensitive data has become an important issue in both the business and personal worlds. In the business world, companies find themselves entrusted with sensitive employee, client, and customer data which must be properly regulated and protected while it is in their custody. Similarly, users must be conscientious about the storage of sensitive data on their own personal computer systems, which may be used or infiltrated by others. Users may also unwittingly misplace or forget about sensitive data which is stored on their systems. Accordingly, companies and individuals with this type of data stored on their computer systems run the risk of having that data exposed or improperly used.

SUMMARY

Systems and methods for scanning computer systems and for identifying sensitive data stored in those computer systems are provided. A computer-implemented method for managing a scan of a computer for sensitive data comprises the steps of providing a first computer comprising a computer-readable medium and a scan manager. The scan manager may comprise a module or distinct software modules embodied on a computer-readable medium, configured to access at least one memory for data and instructions. The first computer may receive a request to scan a second computer and identify files stored on the second computer based on at least one category of sensitive information. The first computer may also receive recipient information comprising information identifying intended recipients of a scan report containing results of the scan.

The scan manager may be used to respond to the request to scan by generating a user profile based on the at least one category of sensitive information and recipient information. The scan manager may make the user profile available to a category server for use in creating a scan profile defining scan criteria and may deploy a scan agent to the second computer to conduct the scan of the files of the second computer, the scan conducted based on the scan profile. When the scan is complete and upon creation of the scan report, the scan manager may make the scan report available to the intended recipients based on the recipient information.

Certain embodiments provide for authenticating a user when he attempts to access the scan manager application. Some further provide for receiving a list of recipients to receive a scan report. Others also provide for the user designating the categories of sensitive data for use in the scan and for the user initiating a scan.

Further embodiments provide for creating a user profile based on the information received from the user and making the user profile available to a category server. They may also provide for receiving a request to deploy a scan agent from a category server and for deploying a scan agent to the user's computer system.

Certain embodiments may send the scan report to designated recipients. Some may also allow for sending error notifications should an error result during the scan.

It is to be understood that both the foregoing description and the following description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

BRIEF DESCRIPTION OF THE DRAWINGS

FIG. 12 is an example of a scan report;

DETAILED DESCRIPTION

Reference will now be made in detail to the present exemplary embodiments of the invention, examples of which are illustrated in the accompanying drawings. Wherever convenient, the same reference numbers will be used throughout the drawings to refer to the same or like parts.

Figure 1A:
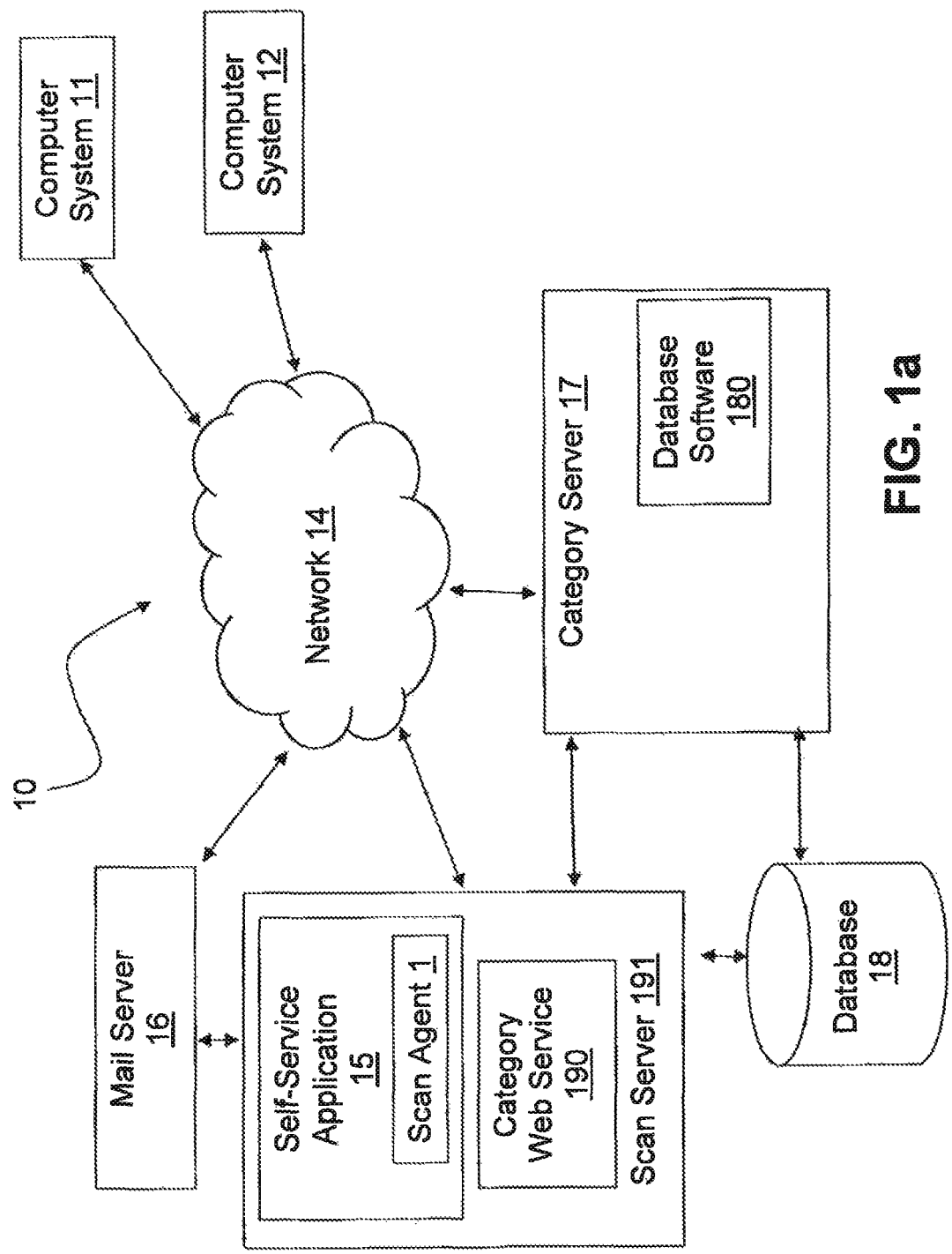
FIG. 1a is a block diagram of an exemplary content scanning system.

FIG. 1a shows an exemplary embodiment of a system 10 for managing scanning of a computer system for sensitive data consistent with the disclosure herein. As shown in FIG. 1a, system 10 may comprise a Mail Server 16, a Category Server 17, a Database 18, a Scan Server 191, and one or more Computer Systems 11, 12. One of skill in the art will appreciate that although one Scan Server, one Category Server, one Mail Server, and two Computer Systems are depicted in FIG. 1a, any number of these entities may be provided. Furthermore, one of ordinary skill in the art will recognize that functions provided by one or more entities of system 10 may be combined.

As shown in system 10, one or more of Computer Systems 11, 12, Scan Server 191, Category Server 17, Database 18, and Mail Server 16 may be operatively connected to one another via a Network 14. Network 14 may be the Internet, an intranet, or any type of wired or wireless communication system. Connections may be implemented through a direct communication link, a local area network (LAN), a wide area network (WAN) and/or other suitable connections. Database 18 may be implemented as a separate database as shown in FIG. 1a or an internal database stored, for example, on Scan Server 191 or Category Server 17. Database 18 may be accessed by other components in system 10 directly via an external connection or via network 14.

Computer Systems 11 and 12 may be, for example, special purpose computers or general purpose computers (e.g. personal computers, network computers, etc.) having one or more processors, memories, and/or nonvolatile storage devices (not shown in FIG. 1a). In at least one embodiment, users use a web browser from Computer Systems 11, 12 connected to network 14 to access the Self-Service Application 15, which functions as a manager for the scanning process.

Mail Server 16, Category Server 17, and Scan Server 191 may be any type of computers or computer systems, which can be implemented in various ways. Computers or computer systems, for example, may comprise one or more processors, a memory, an input/output (I/O) device, and a nonvolatile storage device. A computer or computer system may also comprise an internal or external database. The components of a computer or computer system may connect through a local bus interface.

As shown in FIG. 1a, Scan Server 191 may comprise one or more applications, such as Self-Service Application 15. Applications may comprise one or more computer modules of computer-readable instructions which, when executed by a processor, may cause a computer to perform steps of a method. Computer-readable instructions may be stored on a computer-readable medium, such as a memory or disk.

Scan Server 191 may also comprises Scan Agent 1, which is a computer application that conducts the scan of a computer, such as Computer System 11. In one embodiment the Scan Agent 1 is the Edge™ Client system available from Vericept Corporation of Denver, Colo., however, any suitable scan agent may be employed. Scan Agent 1 may reside in memory on Scan Server 191, or in memory in another part of System 10. Scan Agent 1 may be stored externally, such as on an external memory or disk.

In certain embodiments, Scan Server 191 may be a computer server with web services enabled, containing, for example, a Category Web Service 190. for initiating various tasks and a Self-Service Application 15 for managing scans.

System 10 may also comprise a Mail Server 16 which may be connected to Scan Server 191 directly or via Network 14. Mail Server 16 may be a computer server system utilizing a mail server application such as a Microsoft Exchange Server™ system. Mail Server 16 may be used to deliver scan reports, error messages, and other notifications to users.

System 10 also contains a Category Server 17. The Category Server 17 may be a computer server utilizing a web server application. It also may include Database Software 180 for managing information. In at least one embodiment, Category Server 17 comprises a Dedicated Edge Access™ Server system available from Vericept Corporation of Denver, Colo. In the Category Server 17, categories are created and configured. A category, also known as a policy, is the identification of a certain type of sensitive data. The Category Server may also utilize the results from a Scan Agent 1.

Category Server 17 may also create scan profiles, process scan results, and track a user's scan progress. The scan profiles, scan results, tracking results, and the software instructions used by a computer to create the scan profiles, scan results, and tracking results are stored in a database, such as Database 18 and/or Database 180. Database 18 may also store other information such as user information, user categories, user profiles, other administrative data, and the software instructions used by a computer to create such other information. In at least one embodiment, Database 18 is a structured query language database.

System 10 may allow for the creation of categories of sensitive data as well as the ability to designate some of the categories as mandatory and others as optional. Examples of such categories are Personally Identifiable Information, such as social security numbers, birthdays, or addresses, Payment Card Industry Information such as credit card numbers, or any other category of sensitive data that one may define.

This configuration of System 10 allows the process to be installed temporarily on a user's system while managing a scan rather than requiring a permanent installation on the computer system of a user. It is also a "Self-Service" process in the sense that it is completely user initiated and is not latently stored and running on a computer system.

Figure 1B:
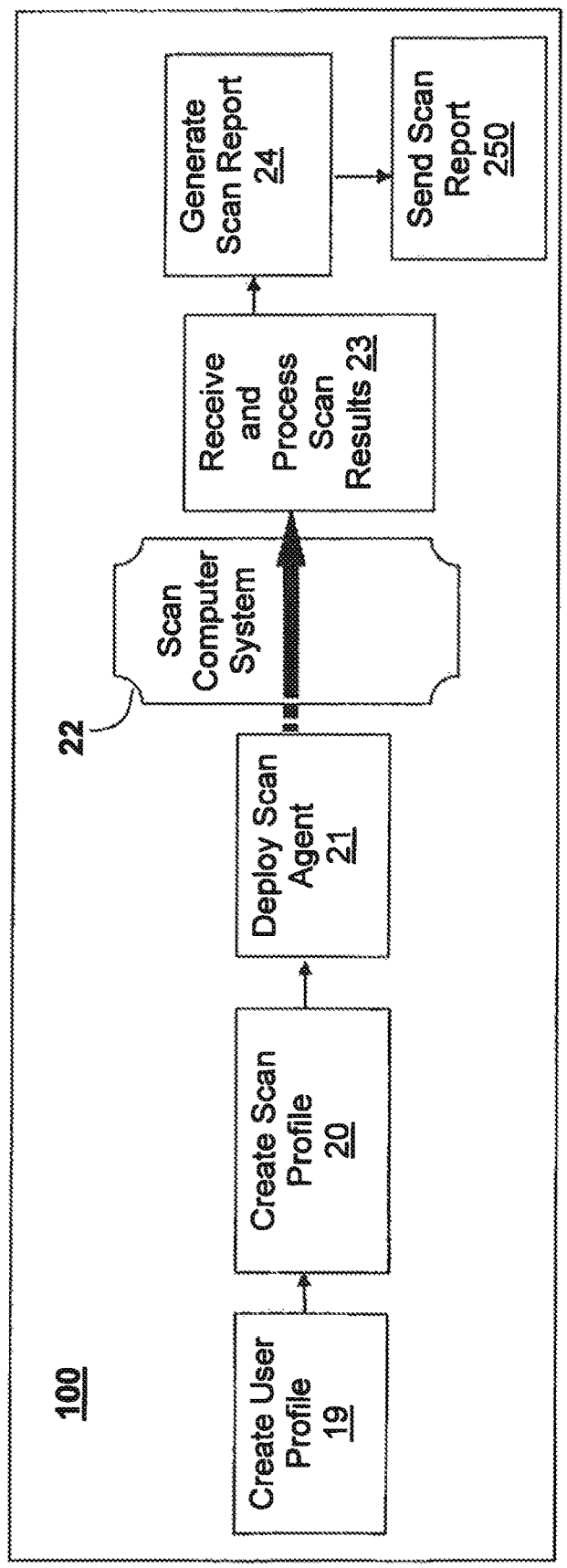
FIG. 1b is a flowchart depicting an exemplary process for content scanning.

FIG. 1b shows a flowchart illustrative of the content scanning system process. The scan process starts at stage 19 by creating a user profile. The Create User Profile stage 19, which may be embodied in a distinct software module, can be seen in more detail in FIG. 2.

Figure 2:
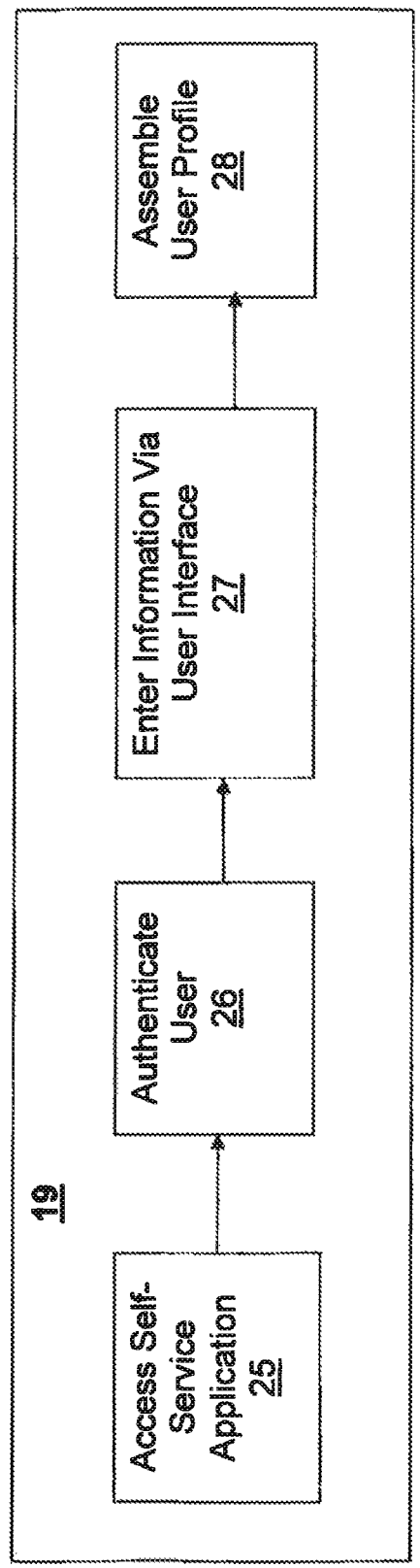
FIG. 2 is a flowchart depicting an exemplary process for creating a user profile.

As shown in FIG. 2, a user initiates the scan process by accessing the Self-Service Application 15 via, for example, Computer System 11 (stage 25). The user may access Self-Service Application 15 by, for example, entering a web address into a browser such as Microsoft Internet Explorer™ or by invoking another suitable method to direct a browser to Self-Service Application 15.

After accessing the Self-Service Application 15, Self-Service Application 15 authenticates the user at stage 26. For example, to authenticate the user, the user ay be prompted to enter user identification information, such as a User ID. The user may also be prompted to enter security information, such as a password. This information may then be used by the Self-Service Application 15 to authenticate the user. Alternatively, a user could be authenticated by a "Single Sign On" system.

Upon successful authentication, the Self-Service Application 15 retrieves the user's information from Database 18 (stage 27). Self-Service Application 15 may store the information, for example in a memory or in a database such as Database 18, for future use.

Figure 3:
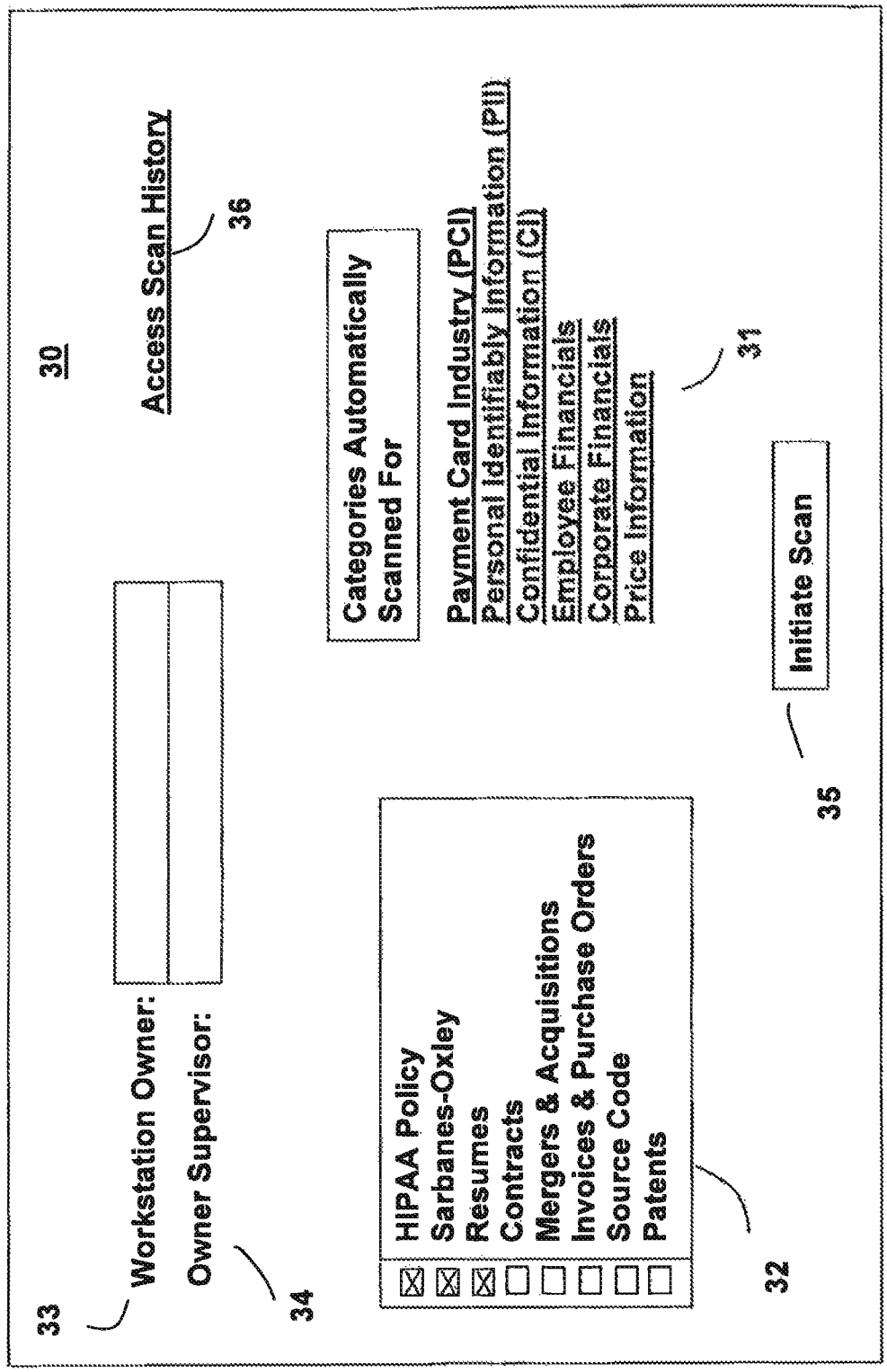
FIG. 3 is an example of an exemplary screen for the user interface of the Self-Service Application.

In stage 28, Self Service Application receives information from the user regarding the scan the user wants to perform. To gather the information, Self-Service Application may present the user with a user interface screen, which the user may use to enter preferences about the scan that the user wants to have performed FIG. 3 is an example of an exemplary screen for the user interface of the Self-Service Application. As shown in FIG. 3, user interface preference screen 30 may display a list 31 of the categories that the scan will automatically use for categorizing documents during the scan. Also presented may be a list 32 of optional categories that the user may select for use during the scan. It is understood that the user interface preference screen 30 may be predefined and arranged to list any combination or number of categories in the optional list 32 and automatic mandatory list 31, or may include only an optional list 32 or only an automatic mandatory list 31. Further, the user interface preference screen 30 may list categories other than those identified in FIG. 3.

In stage 27, the user may also designate who will receive the scan report, that is, the intended recipients. For example, as shown in FIG. 3, the user may designate the workstation owner and her supervisor as intended recipients by entering the workstation owner's email address into the workstation owner field 33 and the workstation owner's supervisor's email address into the owner supervisor field 34. In at least one embodiment, the logged-in user automatically will be a scan report recipient. In some embodiments, the preference screen 30 may present fields, not shown, for identifying or entering a list of others to receive the report. The user interface screen 30 may also provide a link 36 to a user's scan history. The user's scan history may be retrieved from storage. Information on all scans may be displayed to the user or a selected subset of scans will be displayed. For example, in one embodiment, only information from scans within some period of time, such as 30 days, will be presented. After entering some or all of the requested information, the user may begin the scan by, for example, pressing an "Initiate Scan" button 35.

In stage 28, the Self-Service Application 15 assembles a user profile. The user profile may be, for example, a data object or other data package which may be used to provide information to the Category Server 17 to initiate a scan. For example, in one embodiment, the data for the user profile is assembled in an XML file. The user profile may be created based on information received via the user interface at stage 27 and/or data supplied during authentication at stage 26.

Figure 4:
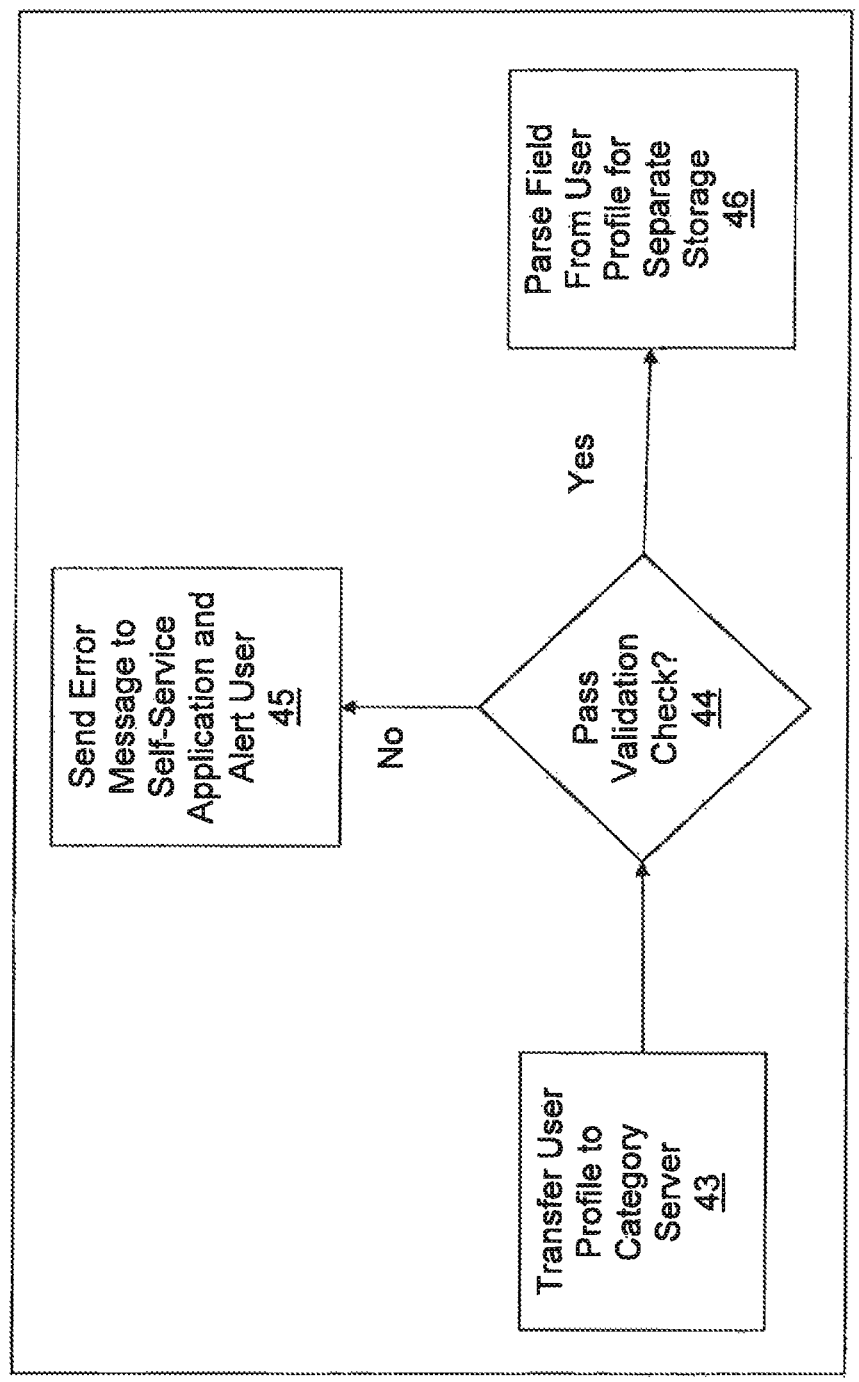
FIG. 4 is a flowchart depicting an exemplary process for validating a user profile.

After a user profile is created, it may be validated and stored at Category Server 17. FIG. 4 is a flowchart depicting an exemplary process for validating a user profile. The user profile is made available to the Category Server 17 at stage 43. The user profile may be sent or transferred to Category Server 17, or stored in a mutually accessible storage location for Category Server 17 to access. In stage 44, the user profile may be validated by the Category Server 17 to ensure that it is in the proper format. In the event that the validation check fails, at stage 45 the Category Server 17 sends an error message to the Self-Service Application 15, and at least one selected recipient, such as the user, is alerted. If the user profile passes validation, then at stage 46, Category Server 17 parses certain fields, such as the user ID, from the user profile and stores the separately parsed fields and the user profile in at least one database, such as Database 18. In some embodiments, this information may also be stored, for example, in Database Software 180.

Returning to FIG. 1*b*, after the user profile is created, the process may proceed to stage 20, where a scan profile is created. The scan profile may be created, for example, by Category Server 17. The scan profile comprises information or instructions for use in performing the scan. For example, the scan profile may include a unique identifier for use in identifying scan results and associating scan results with a requesting user. The unique identifier may also be used by Category Server 17 or other applications to identify and store scan results. The scan profile may also identify the mandatory and optional categories to be used during the scan.

In stage 21, Scan Agent 1 is deployed. Scan Agent 1 is a computer application which scans a computer system for content comprising sensitive data based on the scan profile. Scan Agent 1 may be embodied in a distinct software module, such as an executable file. In at least one embodiment, Scan Agent 1 is an executable that has a file name that matches the unique identifier associated with the scan profile previously discussed. This allows Scan Agent 1 to be associated with its corresponding scan profile.

Figure 5A:
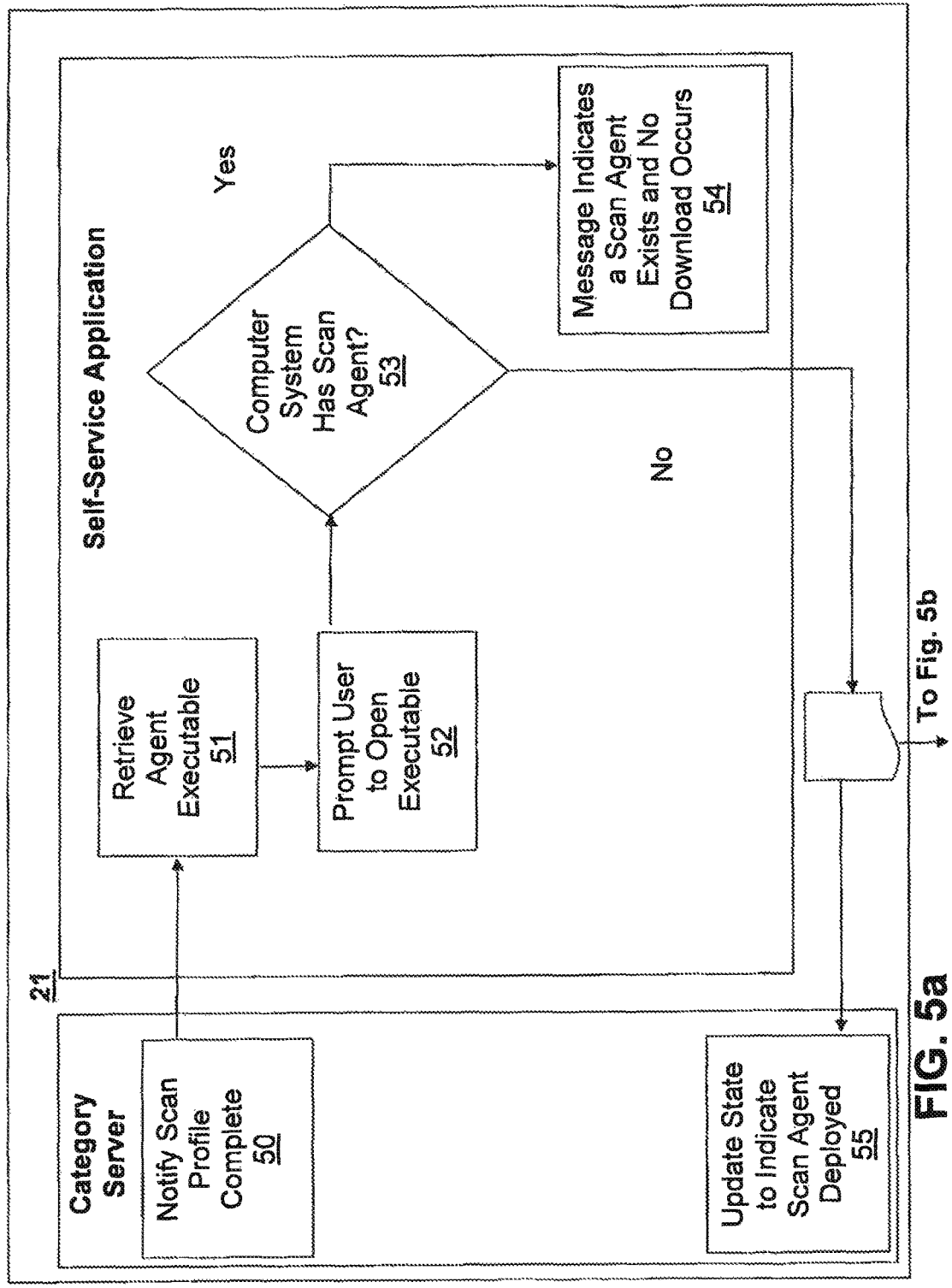
FIG. 5a is a flowchart depicting a portion of an exemplary process for deploying a scan agent.
Figure 5B:
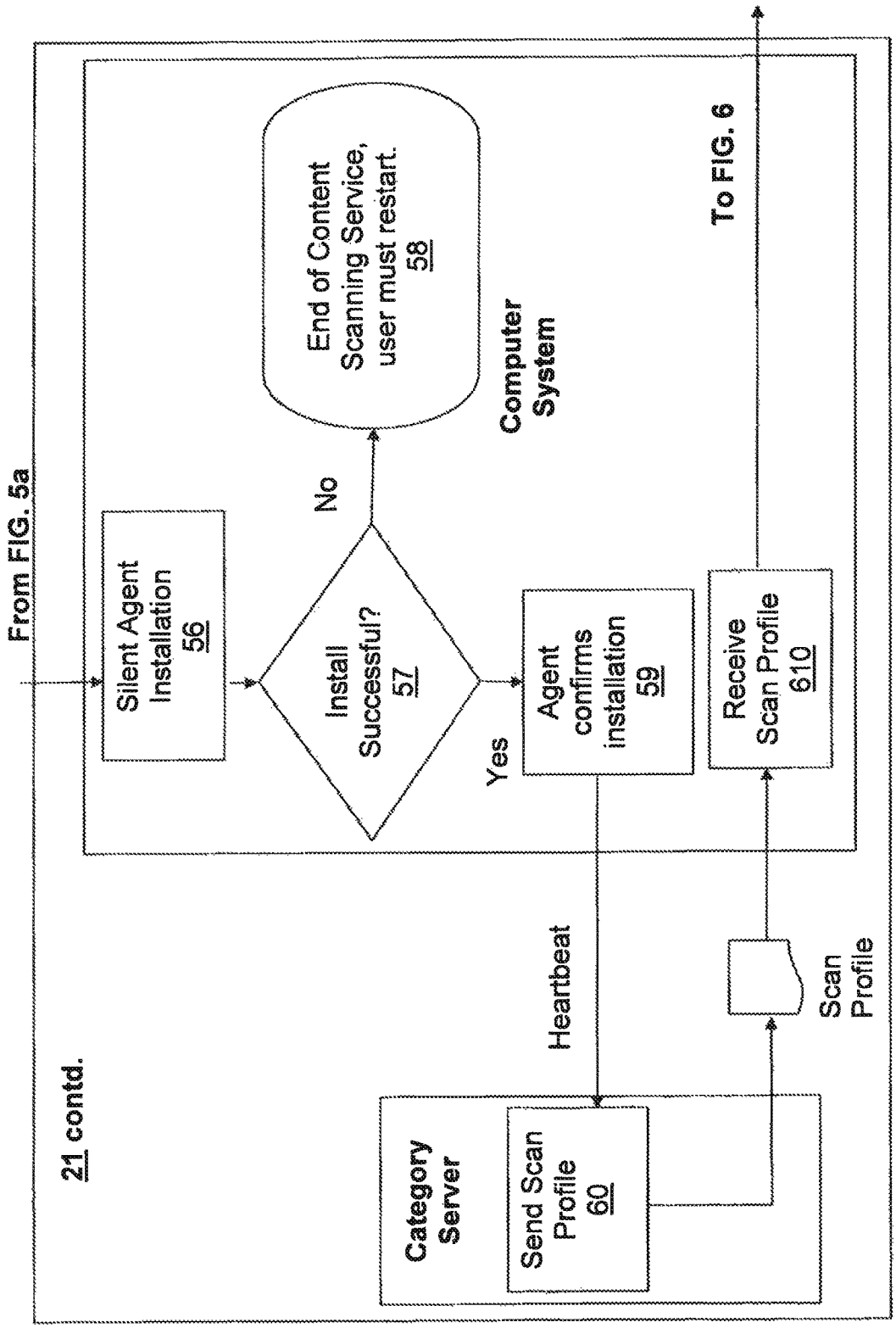
FIG. 5b is a flowchart depicting a second portion of an exemplary process for deploying the scan agent.

Stage 21 is shown in greater detail in FIGS. 5*a* and 5*b*. As shown in FIG. 5*a*, Category Server 17 notifies Self-Service Application 15 that the scan profile has been successfully created (stage 50) by, for example, sending a "deploy scan agent" request. Upon receiving a "deploy scan agent" request from the Category Server 17, Self-Service Application 15 provides the Scan Agent 1 to the user. Self-Service Application 15 may do so, for example, by retrieving an executable copy of Scan Agent 1 from memory (stage 51) and prompting the user that the scan agent is available for downloading (stage 52). In at least one embodiment, Self-Service Application 15 prompts the user to download the scan agent by running an executable installation program for installation of the scan agent on the user's computer system. The scan agent may be downloaded by a user at, for example, Computer System 11 to scan the documents on the user's Computer System 11. In another embodiment, a user at, for example, Computer System 11 may choose to download the scan agent onto a third party computer system, such as Computer System 12, in order to scan the files stored on Computer System 12.

Before actually downloading, Self-Service Application 15 may first check to see if a scan agent has already been downloaded or if a scan is already in progress (state 53). If it is detected that another scan agent already exists on the computer system (i.e. "Yes"), Self-Service Application 15 may not download the scan agent. In stage 54, Self Service Application 15 may inform the user that no new scan agent can be downloaded and/or that a scan is currently in progress. If, in stage 53, Self-Service Application 15 determines that no scan agent exists, the scan agent is downloaded. In stage 55, Category Server 17 receives a notification of successful download, and may update records to reflect that the scan agent has been deployed.

Referring now to FIG. 5*b*, once the scan agent has been downloaded onto the computer system, it installs on the computer system at stage 56. The scan agent may be installed in "silent" mode, which means that the user need not take any further action to complete the installation. If at stage 57, the installation of the scan agent is unsuccessful ("No"), the content scanning process may end (stage 58). In at least one embodiment, the user may restart the process. After a successful installation ("Yes"), in stage 59, the scan agent may confirm successful installation by sending the Category Server 17 a confirmation signal, such as a "heartbeat" signal. In at least one embodiment, the confirmation signal contains the unique identifier generated identifying the scan agent and the scan profile to be associated with the scan agent. After receiving the confirmation signal, at stage 60, the Category Server 17 sends the corresponding scan profile to the scan agent. At stage 610, the scan agent on the computer system receives the scan profile. In at least one embodiment, the scan profile may be encrypted before transmission and is decrypted when received by the scan agent at stage 610.

Returning to FIG. 1*b*, after deploying the scan agent, the scanning of the computer system may begin (stage 22). Stage 22 is shown in greater detail in FIG. 6.

Figure 6:
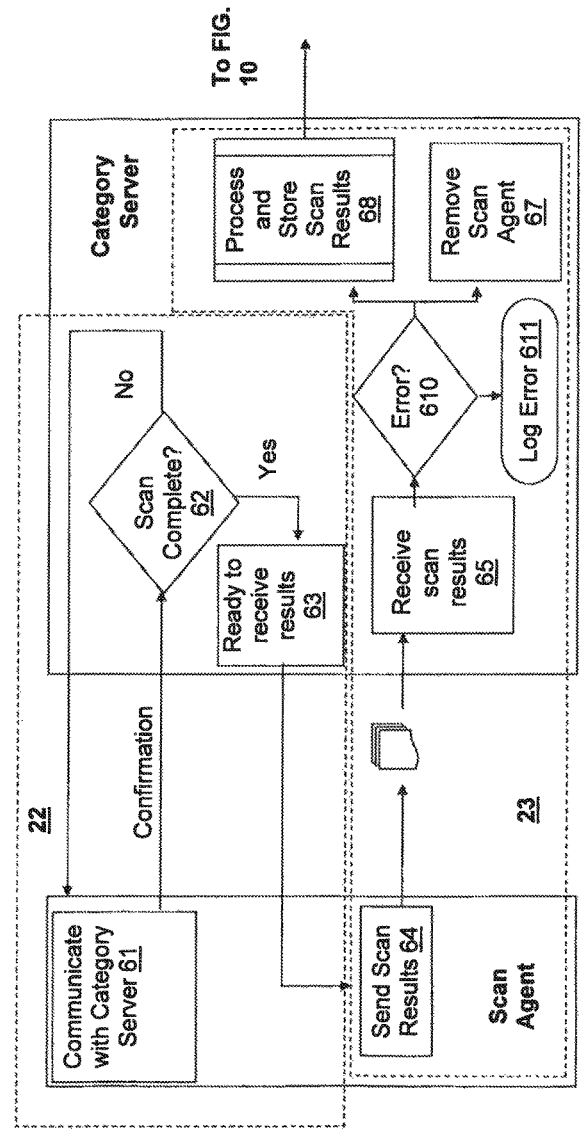
FIG. 6 is a flowchart depicting an exemplary process for scanning a computer system and receiving and processing the scan results.

As shown in FIG. 6, Category Server 17 determines when the scan is complete (stage 62). Category Server 17 may do so by, for example, periodically communicating with the scan agent or the scan agent may notify the Category Server 17 when the scan has been completed. When the scan is complete ("Yes"), the Category Server 17 is ready to receive the results (stage 63) and may so notify the scan agent.

The process continues with stage 23 of FIG. 1b, which is also shown in FIG. 6, in which Category Server 17 receives the results of the scan. In stage 23, as shown in FIG. 6, the scan agent may send the scan results to Category Server 17. In at least one embodiment, the scan results are sent in XML format. They can also be sent as an encrypted file. After the scan results have been received by the Category Server 17 at stage 65, the Category Server 17 may then check the scan results for error (stage 610) If an error is detected ("Yes"), the error may be logged at a stage 611 and the user may need to initiate a new scan. If the scan was successful and no error was detected ("No"), the scan agent may be removed from the computer system at a stage 67 and the scan results are processed at stage 68. Both stages 67 and 68 can happen simultaneously. Scan results may optionally be stored.

Figure 7:
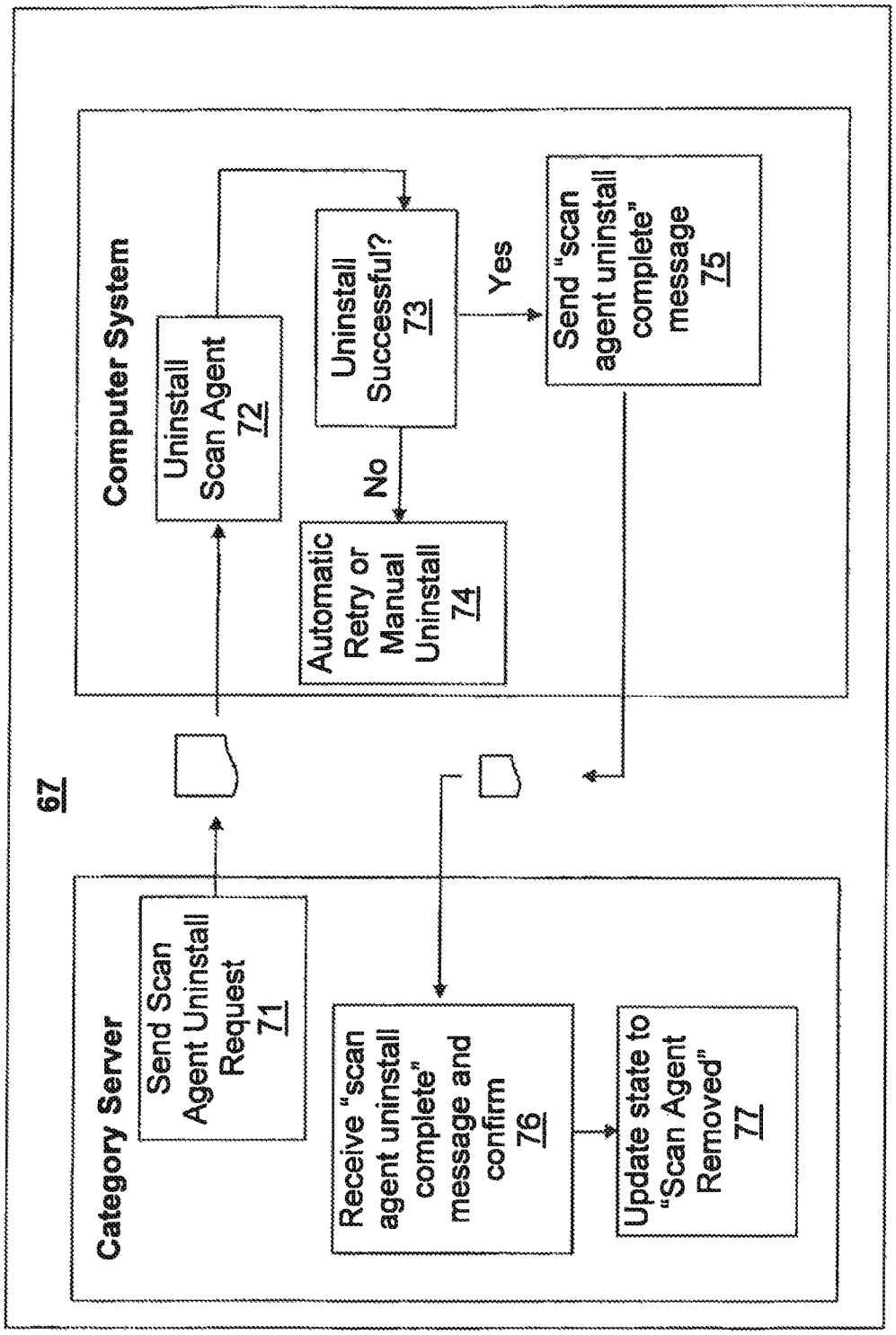
FIG. 7 is a flowchart depicting additional detail of the exemplary process shown in FIG. 6 for removing the scan agent from a computer system.

One exemplary process for removing the scan agent from the computer system is shown in more detail in FIG. 7. As shown, in response to receipt of the scan results, the Category Server 17 may send the scan agent an uninstall request (stage 71). Upon receiving this request, in stage 72, the computer system then uninstalls the scan agent. In stage 73, the computer system determines whether the scan agent was successfully uninstalled. If an error has occurred ("No"), at stage 74 the uninstall may be re-attempted, either manually or automatically. If the scan agent is successfully uninstalled ("Yes"), at a stage 75, the computer system may send a "scan agent uninstall complete" message to the Category Server 17. If so, at a stage 76, the Category Server 17 receives the message and may confirm its receipt to the computer system. The "scan agent uninstall complete" message may contain the scan's unique identifier. At stage 77, the Category Server 17 may update records to indicate that "Scan Agent Removed." Optionally, if the Category Server 17 does not update its records to "Scan Agent Removed" within a certain time period, such as 24 hours, the Category Web Service 190 may send another "uninstall" message to the scan agent. Certain embodiments may also allow a user to cancel a scan from within the Self-Service Application 15. For example, if a user activates the Self-Service Application 15 while a scan is in progress, he may be presented with a "Cancel Scan" button on a screen user interface (not shown). Cancelling the scan may send an "uninstall" message to the computer system to cancel the scan agent's scan that was in progress and uninstall the scan agent.

Figure 8:
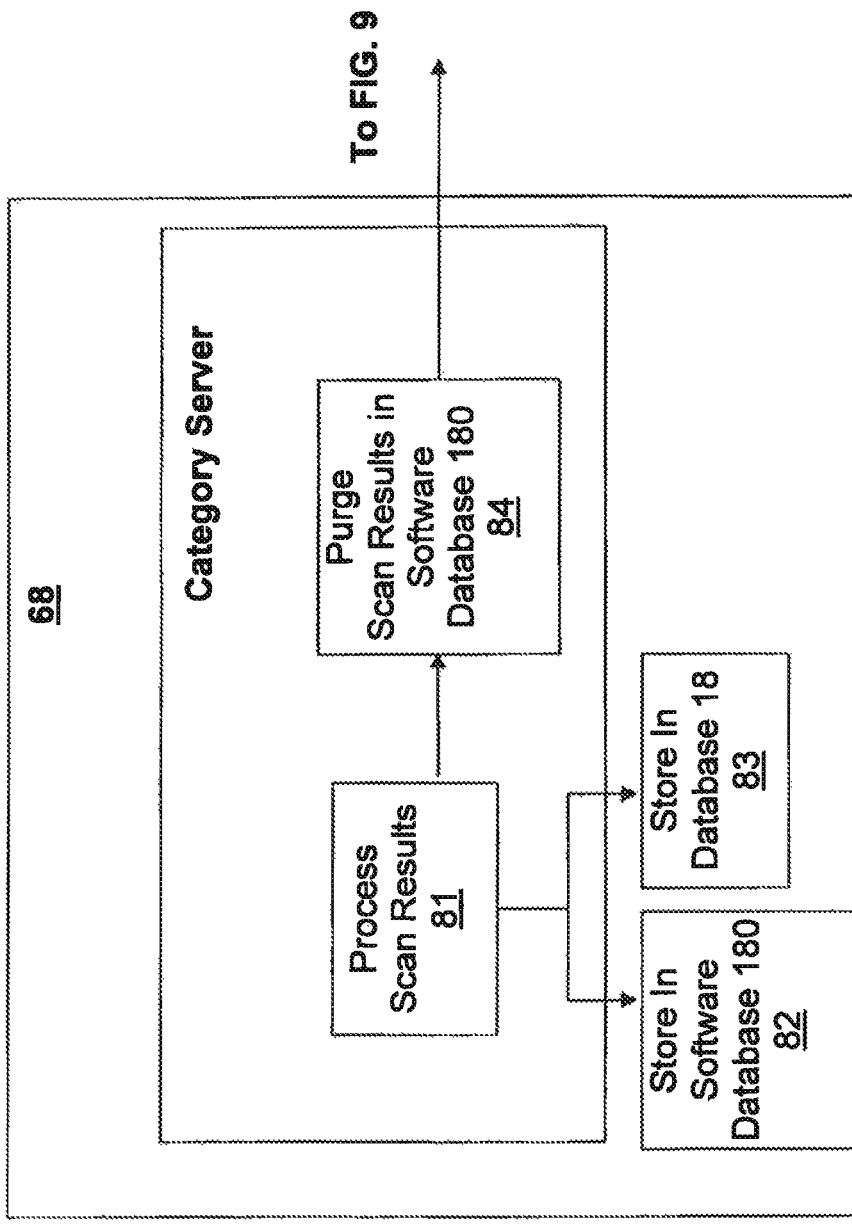
FIG. 8 is a flowchart depicting additional detail of the exemplary process shown in FIG. 6 for processing and storing the scan results.

Stage 68 for processing and storing scan results can be seen in more detail in FIG. 8. The scan results contain information from the performed scan such as, for example, number of files scanned, number of sensitive files found, sensitive file names, the location of sensitive files on the computer system, categories of sensitive files, scan date, scan duration, and last modified timestamp. In stage 81, scan results may be processed by the Category Server 17. In at least one embodiment, processing comprises storing the scan results in a Software Database 180, such as a MySQL database, at a stage 82, and then transferring the scan results to Database 18 at a stage 83. At stage 84, after the scan results have been transferred to the Database 18, the Database 180 may be purged of data pertaining to the scan results.

Figure 9:
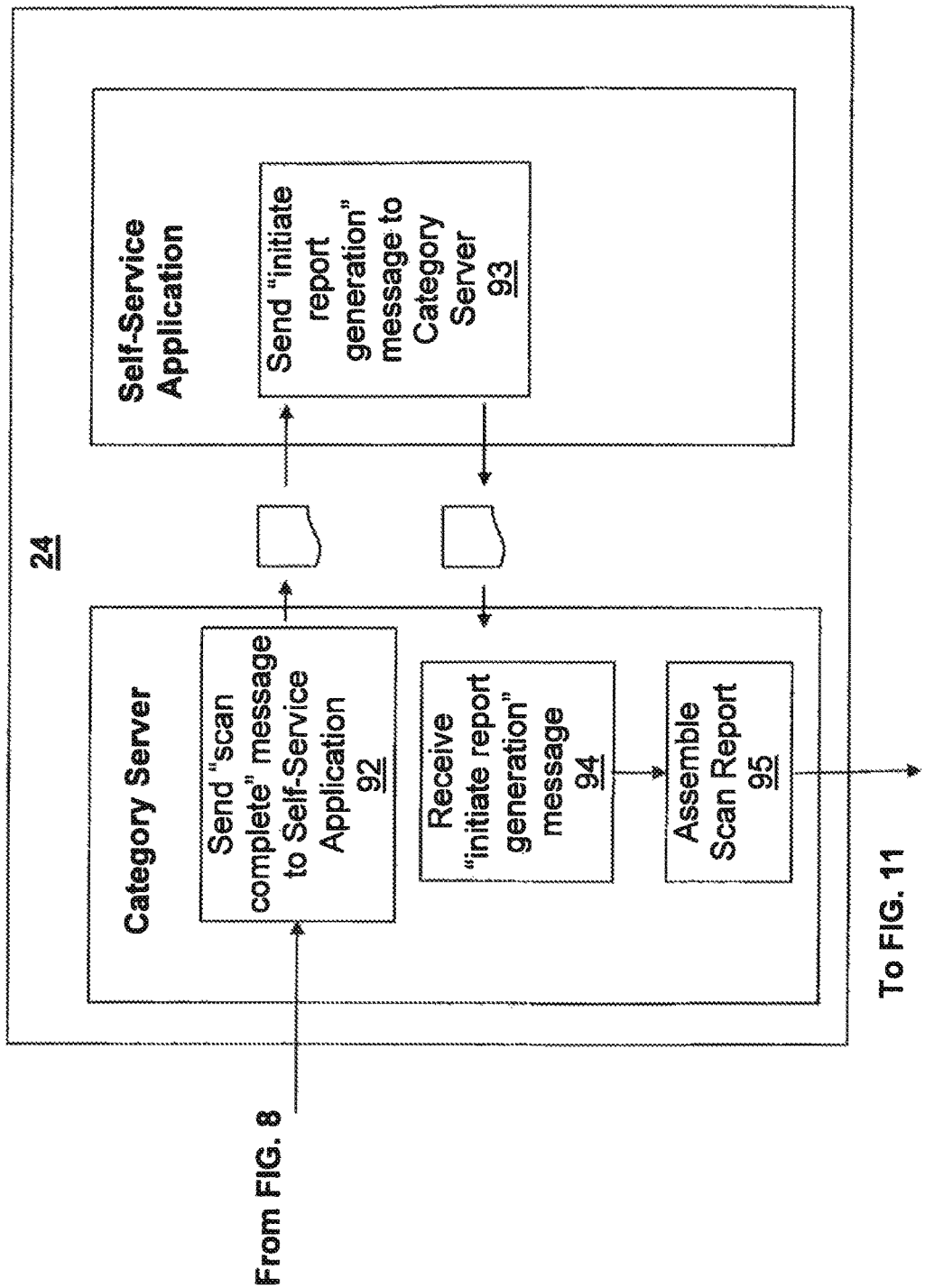
FIG. 9 is a flowchart depicting an exemplary process for scan report generation.

Returning again to FIG. 1b, in stage 24, a scan report is generated. FIG. 9 is a flowchart depicting an exemplary process for scan report generation in greater detail.

Figure 10:
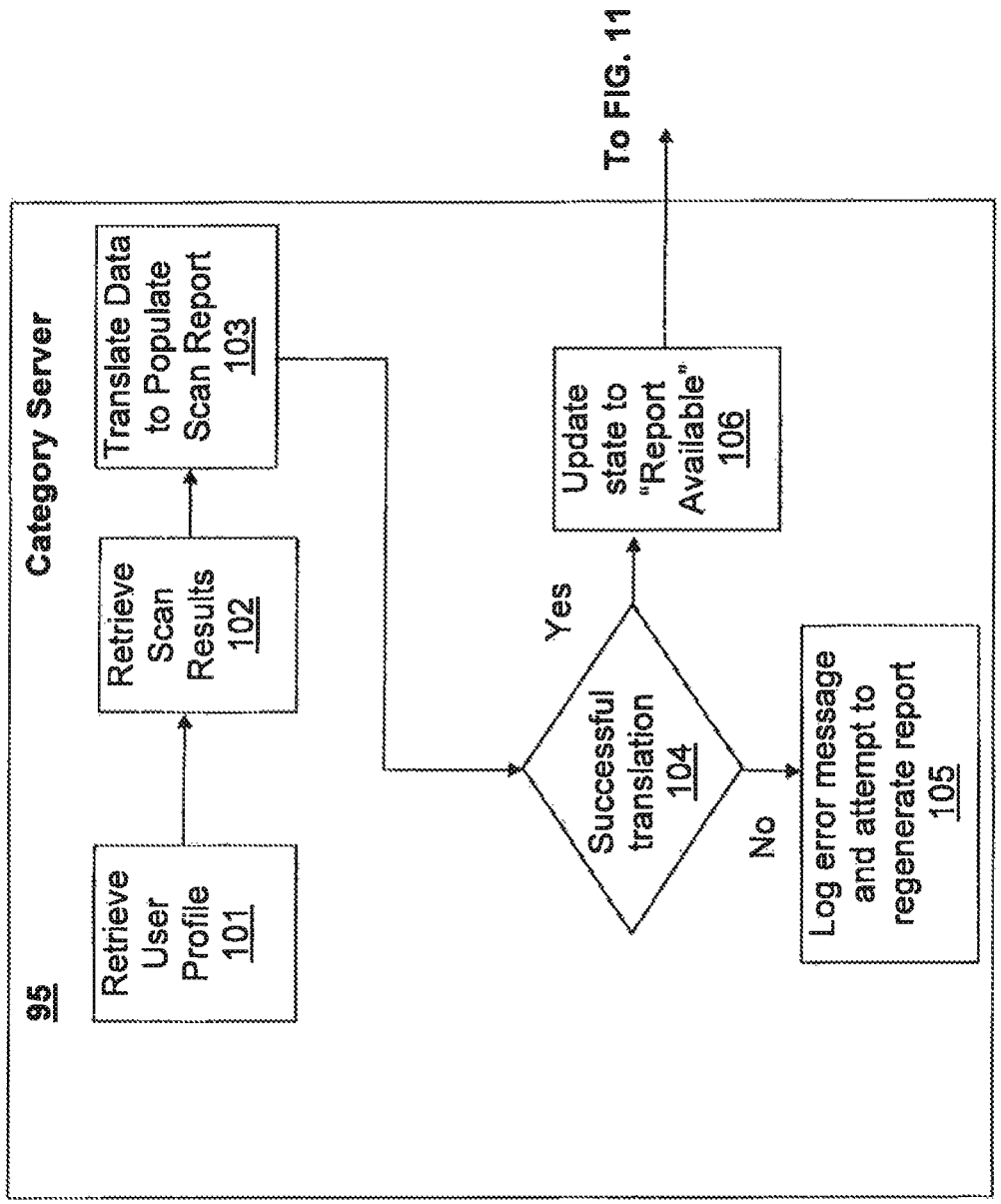
FIG. 10 is a flowchart depicting an exemplary process for assembling a scan report.

In stage 92, Category Server 17 may notify Self-Service Application 15 that the scan is complete by, for example, sending a "scan complete" message. Self-Service Application 15 may respond to the Category Server 17 with an instruction to generate the scan report (stage 93), which Category Server 17 receives in stage 94. In stage 95, Category Server 17 assembles the scan report. An exemplary process for assembling the scan report is shown in more detail in FIG. 10.

In at least one embodiment, stage 24 may begin after the Category Server 17 has finished relaying its "scan complete" confirmation to the Self-Service Application 15. In other embodiments, the Category Server 17 may begin generating a scan report directly after processing the scan results, without receiving an instruction to generate a scan report from the Self-Service Application 15. To generate the scan report, at stage 101, the Category Server 17 may first retrieve the user profile from storage to obtain user profile information, such as the identities and addresses of report recipients. At stage 102, the scan results are also retrieved from the Database 18. At stage 103, the Category Server 17 then uses the data in the User Profile and the scan results to generate a scan report. In certain embodiments, the User Profile and scan results may be stored in XML format and the scan report may be populated in a Microsoft Excel™ spreadsheet file. In this case, the data in the User Profile and the scan results may need to be translated into an Excel™ usable format.

At stage 104, the Category Server 17 checks to ensure that the scan report was successfully populated and that the data from the scan results and User Profile have been successfully translated. If the scan report fails this check ("No"), at stage 105, the Category Server 17 may log an error message and attempt to regenerate the report. If the scan report passes this check ("Yes"), at stage 106, the Category Server 17 updates its state in Database 18 to "Report Available."

Figure 11:
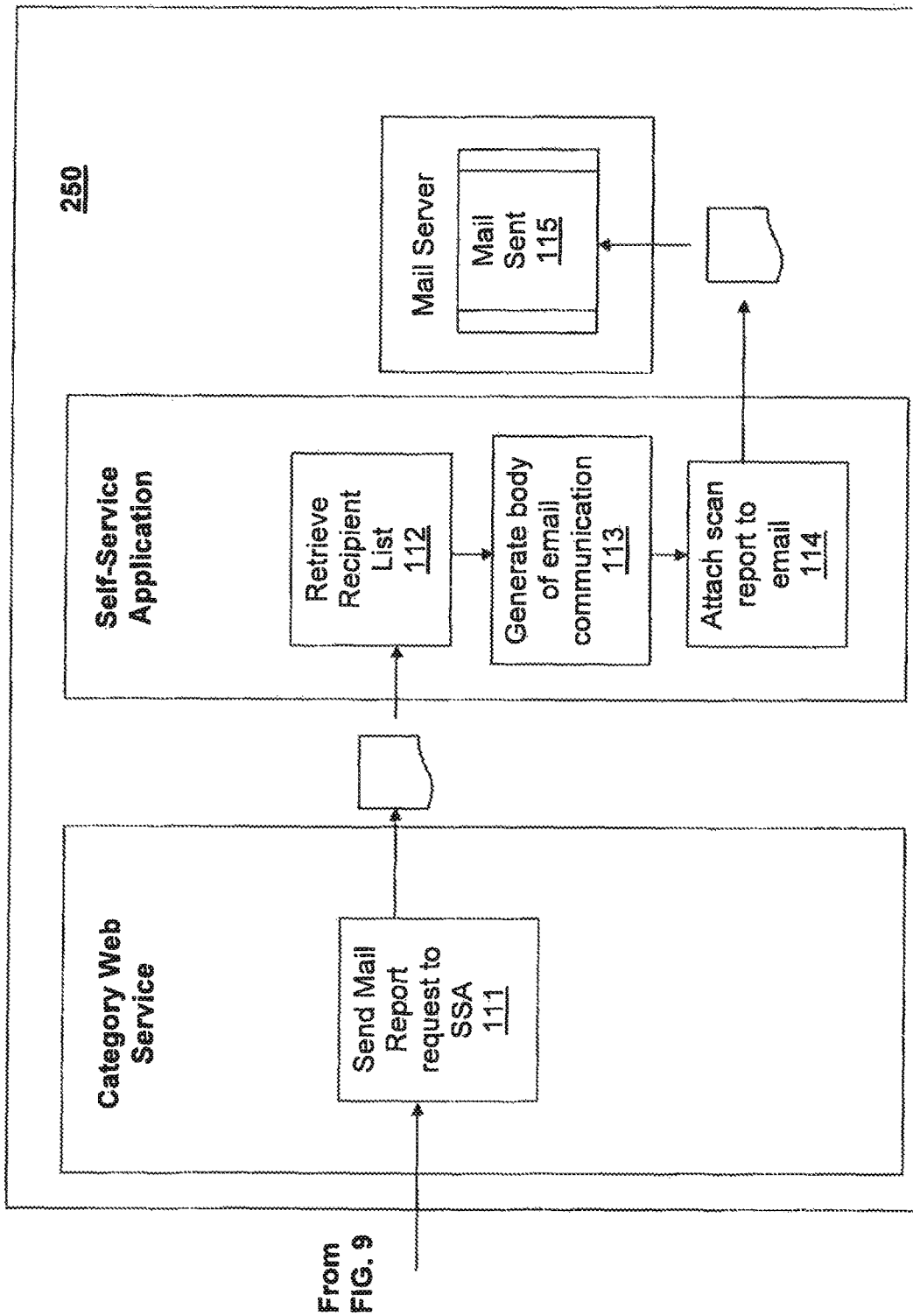
FIG. 11 is a flowchart depicting an exemplary process for sending a scan report.

Returning to FIG. 1b, after the scan report is generated, the scan report may be sent to the appropriate parties (stage 250). FIG. 11 is a flowchart depicting an exemplary process for sending a scan report.

As shown in FIG. 11, in one exemplary process, the Category Web Service 190 sends a "Send Mail Report" request to Self-Service Application 15 (stage 111). This request may include both the scan report itself as well as the recipients to whom it will be sent. At stage 112, the Self-Service Application 15 retrieves the intended recipients of the scan report and their email addresses. The body of the communication is generated at stage 113, the scan report is attached to the email at stage 114, and the scan, report is emailed at stage 115 to the intended recipients. In an alternative embodiment, the scan report may be stored in a location accessible by the user, such as on a server, and the user may be sent instructions for retrieving the report.

The scan report may be sent in a variety of ways. For example, in certain embodiments, mailing of the scan report may be delayed until a pre-defined number of requests have queued, or it could be delayed a pre-defined amount of time. Alternatively, mailing of the scan report could be delayed until a predefined number of reports are ready to be sent in a batch. In at least one embodiment, each report is sent as soon as it is available for mailing. In another embodiment, at stage 115, reports are mailed via a Mail Server 16. An example of a scan report received by a recipient can be seen in FIG. 12. The exemplary scan report shows that a scan of John Doe's computer system resulted in the identification of one document, entitled "Creditcardinformation.doc", located at C:\Data\Client 1\, that contained content classifiable in a selected category, namely "Payment Card Industry (PCI)." Referring to FIG. 3, it can be seen that the "Payment Card Industry (PCI)" category was one of the mandatory categories to be scanned for in list 31 of the user interface screen 30 in defining the User Profile. In at least one embodiment, a user may click on the file names and or locations shown in the Scan Report 120 and be taken directly to the sensitive data.

In certain embodiments, after a particular scan has finished or at predefined intervals, the Category Web Service 190 may initiate one or more post-processing processes. For example, error batch jobs may be executed, data may be purged, and administrative reports may be generated, Data greater than 30 days old may be identified by, for example, determining scans whose state have been set as "Scan Failed" or "Report Sent" for longer than 30 days before the current date. The database may then delete records of these scans and their detailed results, while still maintaining any summarized or trend data. In one embodiment this purging may be executed every certain time period, such as 24 hours.

Figure 13:
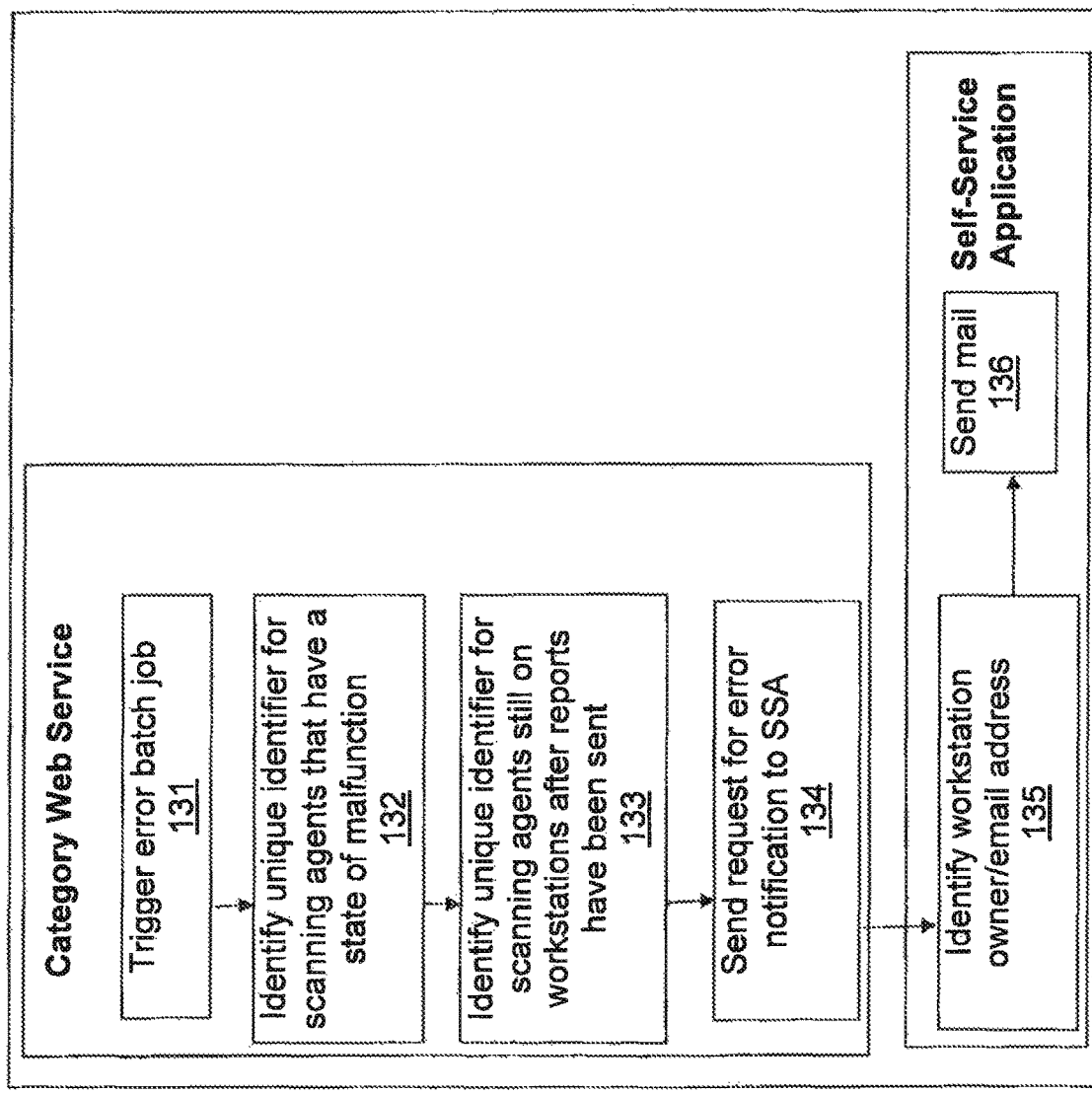
FIG. 13 is a flowchart depicting additional detail of an exemplary process for executing error batch jobs.

FIG. 13 illustrates in more detail an exemplary process for executing error batch jobs. In one exemplary embodiment, Category Web Service 190 may trigger an error batch job (stage 131). In stage 132, the unique identifiers for the scanning agents that have a state of malfunction are identified. They may be identified by, for example, searching for unique identifiers that have had an associated state of "Scan in Progress" for a duration of more than a pre-defined time frame, indicating a malfunction. In stage 133, the Category Web Service 190 identifies unique identifiers for scanning agents that are still identified as being present on computer systems after the scan reports associated with the scanning agents have been sent. Stage 133 allows the Category Web Service 190 to identify those scan agents that have successfully completed the scan but have not yet been removed from the computer system. At stage 134, the Category Web Service 190 sends a request for error notification to Self-Service Application 15. In stage 135, Self-Service Application 15 identifies at least one selected recipient of an error report, such as the user who initiated the scan, who may be the computer system owner, and email address associated with the unique identifiers sent to it by the Category Web Service 190. It may do this by retrieving from Database 18 the User Profile associated with the particular unique identifier and determining the computer system owner and his email address from this information. In at least one embodiment, the request for error notification includes the unique identifier, the scan state, the workstation owner, and the workstation owner's email address. In one embodiment, the error information comprises an identification of a first scan state indicating the continued installation of the scan agent. In another embodiment the error information comprises an identification of a second scan state indicating the continued pendency of the scanning. Self-Service Application 15 may determine in stage 136 the content of the notification based on the scan state sent by the Category Web Service 190. Self-Service Application 15 may then mail notifications to the recipients using, for example, Mail Server 16. In certain embodiments, the error notifications need not be done in batch, but may for example be done individually.

In addition to the post-processing stages described above, the Category Web Service 190 can perform administrative reporting functions. These can include reporting trend analysis or summarized data, both of which are information that is not purged from the system after 30 days.

Although the disclosed modules have been described above as being separate modules, one of ordinary skill in the art will recognize that functionalities provided by one or more modules may be combined. As one of ordinary skill in the art will appreciate, one or more of modules may be optional and may be omitted from implementations in certain embodiments.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations may be implemented in software, hardware, or a combination of hardware and software. Examples of hardware include computing or processing systems, such as personal computers, servers, laptops, mainframes, and micro-processors.

What is claimed is:

1. A system, comprising:
a memory storing instructions; and a processor to execute the instructions to:
send, via a self-service application and to a scan server, configuration information to configure a scan for sensitive information, the configuration information including:
an indication of at least one category of sensitive information, and
an indication of at least one intended recipient of a scan report;
receive, from the scan server, a scan agent via the self-service application,
the scan agent corresponding to a scan profile,
the scan profile including a unique identifier for use in identifying
a scan result and associating the scan result with a user;
install, after receiving the scan agent, the scan agent;
receive the scan profile from a category server;
execute the scan using the scan agent according to the scan profile;
provide the scan result to the category server to be processed,
the scan result and a user profile of the user being used to generate the scan report after the scan result is processed,
the scan result being purged from the category server after being processed, and
the scan report being sent to the at least one intended recipient;
uninstall the scan agent based on the scan result being provided to the category server; and
send a message to the category server indicating that uninstalling of the scan agent is complete,
the message including the unique identifier.

2. The system of claim 1, wherein the scan profile further comprises:
identification of the at least one category of sensitive information.

3. The system of claim 1, wherein the processor is further to:
provide a confirmation signal to the category server,
the confirmation signal containing the unique identifier, and the scan profile being received in response to the confirmation signal.

4. The system of claim 1, wherein the self-service application comprises:
a user interface for indicating the at least one category of sensitive information and the at least one intended recipient of the scan report.

5. The system of claim 4, wherein the user interface comprises:
a display of a scan history of the user.

6. The system of claim 1, wherein the processor is further to:
receive a message from the self-service application indicating that the scan agent is available for download.

7. The system of claim 1, wherein the processor is further to:
provide information to authenticate the user.

8. The system of claim 7, wherein the information is provided to a single sign-on system.

9. The system of claim 1, wherein the at least one category of sensitive information comprises one or more of:
a mandatory category, or
an optional category.

10. The system of claim 1, wherein the scan profile received from the self-service application is encrypted.

11. A non-transitory computer readable medium storing instructions, the instructions comprising:
one or more instructions that, when executed by one or more processors, cause the one or more processors to:
send, via a self-service application, configuration information to configure a scan for sensitive information,
the configuration information including:
an indication of at least one category of sensitive information, and
an indication of at least one intended recipient of a scan report;
receive a scan agent with a unique identifier via the self-service application,
the unique identifier identifying a scan result, associating the scan result with a user, and establishing a correspondence between the scan agent, a scan profile, and the user;
install the scan agent after receiving the scan agent;
provide a confirmation signal, containing the unique identifier, to a category server;
receive the scan profile from the category server in response to the confirmation signal;
decrypt the scan profile;
execute the scan using the scan agent according to the scan profile;
provide the scan result to the category server to be processed,
the scan result and a user profile of the user being used to generate the scan report after the scan result is processed,
the scan result being purged from the category server after being processed, and
the scan report being sent to the at least one intended recipient;
uninstall the scan agent based on the scan result being provided to the category server; and
send a message to the category server indicating that uninstalling of the scan agent is complete,
the message including the unique identifier.

12. The non-transitory computer readable medium of claim 11, wherein the self-service application comprises:
a user interface for indicating the at least one category of sensitive information and the at least one intended recipient of the scan report.

13. The non-transitory computer readable medium of claim 12, wherein the user interface comprises:
a display of a scan history of the user.

14. The non-transitory computer readable medium of claim 11, wherein the one or more instructions, when executed by the one or more processors, further cause the one or more processors to:
receive a message from the self-service application indicating that the scan agent is available for downloading.

15. The non-transitory computer readable medium of claim 11, wherein the one or more instructions, when executed by the one or more processors, further cause the one or more processors to:
provide information authenticating the user.

16. The non-transitory computer readable medium of claim 15, wherein the information is provided to a single sign-on system.

17. The non-transitory computer readable medium of claim 11, wherein the at least one category of sensitive information comprises one or more of:
a mandatory category, or
an optional category.

18. A method, comprising:
providing, by a device, information authenticating a user;
sending, by the device and via an authorized self-service application, configuration information to configure a scan for sensitive information,
the configuration information including:
an indication of at least one category of sensitive information, and
an indication of at least one intended recipient of a scan report;
receiving, by the device, a scan agent with a unique identifier via the authorized self-service application,
the scan agent corresponding to a scan profile, and
the unique identifier identifying a scan result, associating the scan result with the user, and establishing a correspondence between the scan agent, the scan profile, and the user;
installing, by the device and after receiving the scan agent, the scan agent;
providing, by the device, a confirmation signal, containing the unique identifier, to a category server;
receiving, by the device, the scan profile from the category server in response to the confirmation signal;
decrypting, by the device, the scan profile;
executing, by the device, the scan with the scan agent according to the scan profile;
providing, by the device, the scan result to the category server to be processed,
the scan result and a user profile of the user being used to generate the scan report after the scan result is processed,
the scan result being purged from the category server after being processed, and
the scan report being sent to the at least one intended recipient;
uninstalling, by the device, the scan agent based on the scan result being provided to the category server; and
sending, by the device, a message to the category server indicating that uninstalling of the scan agent is complete,
the message including the unique identifier.

19. The method of claim 18, further comprising:
displaying a scan history of the user on a user interface; and
indicating the at least one category of sensitive information and the at least one intended recipient of the scan report.

20. The method of claim 18, further comprising:
receiving a message from the authorized self-service application indicating that the scan agent is available for downloading.

21. The method of claim 18, wherein the at least one category of sensitive information comprises one or more of:
a mandatory category, or
an optional category.

22. The method of claim 18, further comprising:
determining an error during uninstallation of the scan agent; and
attempting a manual or automatic uninstallation of the scan agent.

23. The method of claim 18, wherein providing the scan result to the category server to be processed comprises:
providing the scan result to the category server to be processed,
the scan result being checked for an error,
the error being logged based on the error being detected.

* * * * *